US010128874B2

(12) United States Patent
Khlat et al.

(10) Patent No.: US 10,128,874 B2
(45) Date of Patent: Nov. 13, 2018

(54) RADIO FREQUENCY COUPLER CIRCUITRY

(71) Applicant: Qorvo US, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 70 days.

(21) Appl. No.: 15/250,094

(22) Filed: Aug. 29, 2016

(65) Prior Publication Data
US 2017/0063425 A1 Mar. 2, 2017

Related U.S. Application Data

(60) Provisional application No. 62/211,048, filed on Aug. 28, 2015.

(51) Int. Cl.
*H03F 1/32* (2006.01)
*H04B 1/04* (2006.01)
*H01P 5/18* (2006.01)

(52) U.S. Cl.
CPC ............ *H04B 1/0475* (2013.01); *H01P 5/18* (2013.01); *H04B 2001/0441* (2013.01)

(58) Field of Classification Search
CPC .. H04B 1/0475; H04B 2001/0441; H01P 5/18
See application file for complete search history.

(56) References Cited

U.S. PATENT DOCUMENTS

| 2010/0251314 | A1* | 9/2010 | Olson | H04N 7/104 725/107 |
| 2013/0267943 | A1* | 10/2013 | Hancock | A61B 18/042 606/33 |
| 2014/0128008 | A1* | 5/2014 | Cox | H04B 1/525 455/78 |
| 2014/0347126 | A1* | 11/2014 | Laporte | H03F 1/3247 330/149 |
| 2014/0349595 | A1* | 11/2014 | Cox | H04B 1/0458 455/78 |
| 2015/0195477 | A1* | 7/2015 | White | H04N 5/20 348/731 |
| 2015/0207537 | A1* | 7/2015 | Cox | H04B 1/525 370/278 |

* cited by examiner

*Primary Examiner* — Jay P Patel
(74) *Attorney, Agent, or Firm* — Withrow & Terranova, P.L.L.C.

(57) ABSTRACT

RF coupling circuitry includes a first coupled signal output node, a second coupled signal output node, an RF coupler, RF filtering circuitry, and attenuator circuitry. The RF coupler is configured to couple RF signals from an RF transmission line to provide coupled RF signals. The RF filtering circuitry is coupled to the RF coupler and configured to separate RF signals within a first RF frequency band in the coupled RF signals from RF signals within a second RF frequency band in the coupled RF signals. The attenuator circuitry is coupled between the RF filtering circuitry, the first coupled signal output node, and the second coupled signal output node. The attenuator circuitry is configured to attenuate the RF signals within the first RF frequency band and the RF signals within the second RF frequency band.

20 Claims, 12 Drawing Sheets

RADIO FREQUENCY COUPLER CIRCUITRY

RELATED APPLICATIONS

This application claims the benefit of U.S. provisional patent application No. 62/211,048, filed Aug. 28, 2015, the disclosure of which is incorporated herein by reference in its entirety.

FIELD OF THE DISCLOSURE

The present disclosure relates to radio frequency (RF) coupling circuitry and applications thereof.

BACKGROUND

Carrier aggregation, in which a wireless communications device simultaneously transmits and receives radio frequency (RF) signals over multiple RF frequency bands, has become increasingly popular in order to increase data throughput. Supporting carrier aggregation in a wireless communications device presents several challenges in the design and manufacture of the device. One such challenge is illustrated in FIG. 1, which shows a wireless communications network 10 including a wireless communications device 12, a first base station 14A, and a second base station 14B. While the wireless communications device 12 is located much closer to the first base station 14A than the second base station 14B, the device may communicate with both the first base station 14A and the second base station 14B simultaneously using separate RF frequency bands. For example, the wireless communications device 12 may communicate with the first base station 14A using a Long Term Evolution (LTE) mid-band operating band and communicate with the second base station 14B using an LTE high-band operating band. Simultaneously communicating with the first base station 14A and the second base station 14B over different RF frequency bands increases the amount of data that may be transmitted from the wireless communications device 12 in a given amount of time, but it may also complicate the design of feedback circuitry used in a transmitter of the device to control the transmit power of the RF signals provided therefrom, as discussed with respect to FIG. 2 below.

FIG. 2 shows a conventional RF front end circuitry 16 with closed loop transmit power control. The conventional RF front end circuitry 16 includes an antenna 18, a diplexer 20, a first duplexer 22A, a second duplexer 22B, a first power amplifier 24A, a second power amplifier 24B, first RF coupler circuitry 26A, second RF coupler circuitry 26B, and feedback receiver circuitry 28. The diplexer 20 includes a common node 30A coupled to the antenna 18, a first input/output node 30B coupled to the first duplexer 22A via a first RF transmission line 32A, and a second input/output node 30C coupled to the second duplexer 22B via a second RF transmission line 32B. The diplexer 20 is configured to pass RF transmit signals and RF receive signals within a first RF frequency band between the first input/output node 30B and the common node 30A while attenuating other signals in this path. Further, the diplexer 20 is configured to pass RF transmit signals and RF receive signals within a second RF frequency band between the second input/output node 30C and the common node 30A while attenuating other signals in this path. Accordingly, the diplexer 20 allows for simultaneous transmission and reception of RF signals within the first RF frequency band and the second RF frequency band.

The first duplexer 22A includes a common node 34A, a transmit signal node 34B, and a receive signal node 34C. The common node 34A is coupled to the first input/output node 30B of the diplexer 20. The transmit signal node 34B is coupled to an output of the first power amplifier 24A. While not shown, the receive signal node 34C is often coupled to a low noise amplifier (LNA) for amplifying receive signals provided thereto for further processing. The first duplexer 22A is configured to pass first RF transmit signals TX1 from the first power amplifier 24A between the transmit signal node 34B and the common node 34A while attenuating other signals in this path. Further, the first duplexer 22A is configured to pass first RF receive signals RX1 from the common node 34A to the receive signal node 34C while attenuating other signals in this path. Accordingly, the first duplexer 22A allows for simultaneous transmission and reception of signals within the first RF frequency band.

The second duplexer 22B includes a common node 36A, a transmit signal node 36B, and a receive signal node 36C. The common node 36A is coupled to the second input/output node 30C of the diplexer 20. The transmit signal node 36B is coupled to an output of the second power amplifier 24B. While not shown, the receive signal node 36C is often coupled to an LNA for amplifying RF receive signals provided thereto for further processing. The second duplexer 22B is configured to pass second RF transmit signals TX2 from the second power amplifier 24B between the transmit signal node 36B and the common node 36A while attenuating other signals in this path. Further, the second duplexer 22B is configured to pass second RF receive signals RX2 from the common node 36A to the receive signal node 36C while attenuating other signals in this path. Accordingly, the second duplexer 22B allows for simultaneous transmission and reception of signals in the second RF frequency band.

The first power amplifier 24A is configured to receive and amplify first modulated transmit signals MTX1 to provide the first RF transmit signals TX1. The second power amplifier 24B is configured to receive and amplify second modulated transmit signals MTX2 to provide the second RF transmit signals TX2.

The first RF coupler circuitry 26A includes a first RF coupler 38 and first attenuator circuitry 40. The first RF coupler 38 is arranged adjacent to the first RF transmission line 32A such that a portion of the RF signals provided via the first RF transmission line 32A are coupled by the first RF coupler 38 and provided to the first attenuator circuitry 40 as first RF feedback signals RF_FB1. The first attenuator circuitry 40 is coupled between the first RF coupler 38 and the feedback receiver circuitry 28 and configured to attenuate the first RF feedback signals RF_FB1 to compensate for the frequency dependence of the coupling factor of the first RF coupler 38 as well as to ensure that the first feedback signals RF_FB1 are within the dynamic range of the feedback receiver circuitry 28 over the entire power range of the signals.

The second RF coupler circuitry 26B includes a second RF coupler 42 and second attenuator circuitry 44. The second RF coupler 42 is arranged adjacent to the second RF transmission line 32B such that a portion of the RF signals provided via the second RF transmission line 32B are coupled by the second RF coupler 42 and provided to the second attenuator circuitry 44 as second RF feedback signals RF_FB2. The second attenuator circuitry 44 is coupled between the second RF coupler 42 and the feedback receiver circuitry 28 and configured to attenuate the second RF feedback signals RF_FB2 to compensate for the frequency dependence of the coupling factor of the second RF coupler 42 as well as to ensure that the second feedback signals RF_FB2 are within the dynamic range of the feedback receiver circuitry 28 over the entire power range of the signals.

The feedback receiver circuitry 28 is coupled to each one of the first power amplifier 24A and the second power amplifier 24B, such that the feedback receiver circuitry 28 is coupled between the first RF coupler circuitry 26A, the second RF coupler circuitry 26B, the first power amplifier 24A, and the second power amplifier 24B. The feedback receiver circuitry 28 is configured to receive the first RF feedback signals RF_FB1 and provide a first power amplifier control signal PA_CNT1 to the first power amplifier 24A based thereon, where the first power amplifier control signal PA_CNT1 is configured to change one or more operating parameters of the first power amplifier 24A in order to alter the transmit power of RF transmit signals provided therefrom. Further, the feedback receiver circuitry 28 is configured to receive the second RF feedback signals RF_FB2 and provide a second power amplifier control signal PA_CNT2 to the second power amplifier 24B based thereon, where the second power amplifier control signal PA_CNT2 is configured to change one or more operating parameters of the second power amplifier 24B in order to alter the transmit power of RF transmit signals provided therefrom. While not shown, the feedback receiver circuitry 28 may include one or more feedback receiver amplifiers to amplify the first RF feedback signals RF_FB1 and the second RF feedback signals RF_FB2, and signal processing circuitry for generating the first power amplifier control signal PA_CNT1 and the second power amplifier control signal PA_CNT2 based thereon. The first RF coupler circuitry 26A, the second RF coupler circuitry 26B, and the feedback receiver circuitry 28 form a closed loop feedback system in order to keep the transmit power of RF transmit signals provided from the conventional RF front end circuitry 16 within a desired range.

The conventional RF front end circuitry 16 suffers from several drawbacks. First, the conventional RF front end circuitry 16 is not suited for applications in which the diplexer 20, the first duplexer 22A, and the second duplexer 22B are replaced with a multiplexer, as is preferred in modern RF front end circuitry due to the increase in performance and decrease in area consumption associated therewith. While it is possible to create a closed loop feedback system with a multiplexer using the above approach, it would require separate RF coupler circuitry for each one of the multiplexed RF frequency bands. Such an approach would consume a large area, and thus would not be suitable for applications in which area is a design concern. Since modern wireless communications devices are supporting an ever increasing number of RF frequency bands, the conventional approach discussed above is becoming less and less desirable. In addition to the above, placing the first RF coupler circuitry 26A and the second RF coupler circuitry 26B downstream of the diplexer 20 in the conventional RF front end circuitry 16 may decrease the accuracy of measurements provided therefrom, as the diplexer 20 may cause changes in RF transmit signals as they are passed to the antenna 18. In general, it is desirable to measure the transmit power of RF transmit signals as close to the antenna 18 as possible to ensure the accuracy of these measurements. Finally, when presented with the situation identified above in FIG. 1 wherein a first RF signal with a relatively low transmit power is provided, for example, from the first power amplifier 24A and a second RF signal with a relatively high transmit power is provided, for example, from the second power amplifier 24B, the first RF signal with the relatively low transmit power is highly susceptible to intermodulation distortion due to the second RF signal with the relatively high transmit power. Accordingly, the first RF feedback signals RF_FB1 may be inaccurate, leading to undesired adjustments to the transmit power of the first RF transmit signal TX1.

In light of the above, there is a need for improved RF coupler circuitry for providing closed loop transmit power control for carrier aggregation configurations.

SUMMARY

The present disclosure relates to radio frequency (RF) coupling circuitry and applications thereof. In one embodiment, RF coupling circuitry includes a first coupled signal output node, a second coupled signal output node, an RF coupler, RF filtering circuitry, and attenuator circuitry. The RF coupler is configured to couple RF signals from an RF transmission line to provide coupled RF signals. The RF filtering circuitry is coupled to the RF coupler and configured to separate RF signals within a first RF frequency band in the coupled RF signals from RF signals within a second RF frequency band in the coupled RF signals. The attenuator circuitry is coupled between the RF filtering circuitry, the first coupled signal output node, and the second coupled signal output node. The attenuator circuitry is configured to attenuate the RF signals within the first RF frequency band and the RF signals within the second RF frequency band, delivering the RF signals within the first RF frequency band to the first coupled signal output node and the RF signals within the second RF frequency band to the second coupled signal output node. By isolating the RF signals within the first RF frequency band from the RF signals within the second RF frequency band in the RF coupler circuitry, the dynamic range of feedback receiver circuitry used to process the RF signals within the first RF frequency range and the RF signals within the second RF frequency range may be increased. Accordingly, the accuracy of feedback generated from measurements made by the RF coupler circuitry may be increased.

In one embodiment, RF front end circuitry includes an antenna, transceiver circuitry, an RF transmission line coupled between the antenna and the transceiver circuitry, and RF coupler circuitry. The RF coupler circuitry includes a first coupled signal output node, a second coupled signal output node, an RF coupler, RF filtering circuitry, and attenuator circuitry. The RF coupler is configured to couple RF signals from an RF transmission line to provide coupled RF signals. The RF filtering circuitry is coupled to the RF coupler and configured to separate RF signals within a first RF frequency band in the coupled RF signals from RF signals within a second RF frequency band in the coupled RF signals. The attenuator circuitry is coupled between the RF filtering circuitry, the first coupled signal output node, and the second coupled signal output node. The attenuator circuitry is configured to attenuate the RF signals within the first RF frequency band and the RF signals within the second RF frequency band, delivering the RF signals within the first RF frequency band to the first coupled signal output node and the RF signals within the second RF frequency band to the second coupled signal output node. By isolating the RF signals within the first RF frequency band from the RF signals within the second RF frequency band in the RF coupler circuitry, the dynamic range of feedback receiver circuitry used to process the RF signals within the first RF frequency range and the RF signals within the second RF frequency range may be increased. Accordingly, the accuracy of feedback generated from measurements made by the RF coupler circuitry may be increased.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 3:
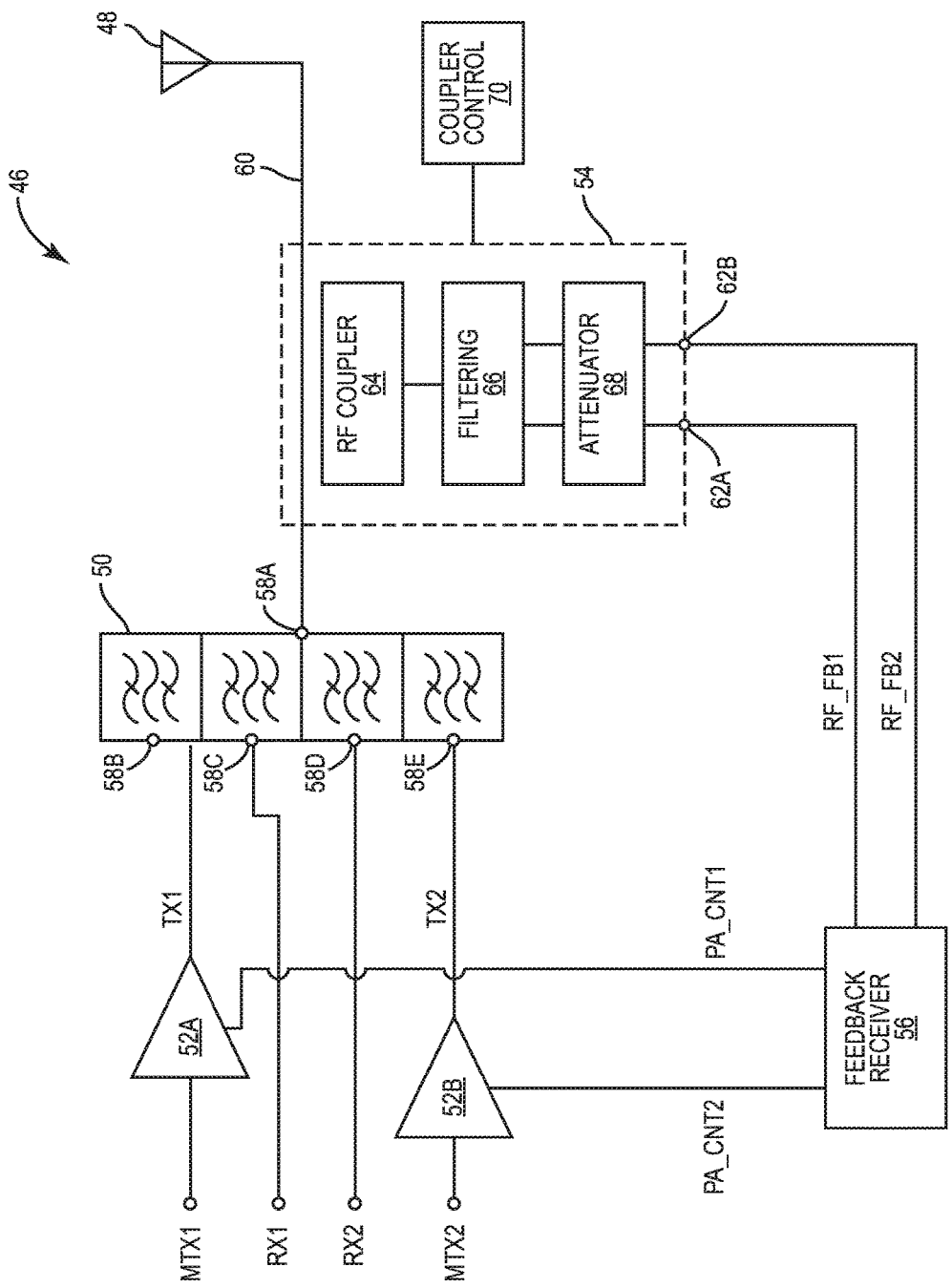
FIG. 3 is a functional schematic of RF front end circuitry according to one embodiment of the present disclosure.

FIG. 3 shows radio frequency (RF) front end circuitry 46 according to one embodiment of the present disclosure. The RF front end circuitry 46 includes an antenna 48, a multiplexer 50, a first power amplifier 52A, a second power amplifier 52B, RF coupler circuitry 54, and feedback receiver circuitry 56. The multiplexer 50 includes a common node 58A coupled to the antenna 48 via an RF transmission line 60, a first input/output node 58B coupled to an output of the first power amplifier 52A, a second input/output node 58C, a third input/output node 58D, and a fourth input/output node 58E coupled to an output of the second power amplifier 52B. The multiplexer 50 is configured to pass RF transmit signals within a first RF frequency band from the first input/output node 58B to the common node 58A, pass RF receive signals within the first RF frequency band RX1 from the common node 58A to the second input/output node 58C, pass RF receive signals within a second RF frequency band RX2 from the common node 58A to the third input/output node 58D, and pass RF transmit signals within the second RF frequency band from the fourth input/output node 58E to the common node 58A, all while attenuating other signals in these signal paths. Accordingly, the multiplexer 50 allows for simultaneous transmission and reception of RF signals within the first RF frequency band and the second RF frequency band.

The first power amplifier 52A is configured to receive and amplify first modulated transmit signals MTX1 to provide the first RF transmit signals TX1. The second power amplifier 52B is configured to receive and amplify second modulated transmit signals MTX2 to provide the second RF transmit signals TX2. While not shown, the second input/output node 58C of the multiplexer 50 may be coupled to a low noise amplifier (LNA) for amplifying the RF receive signals within the first RF frequency band for further processing. Similarly, the third input/output node 58D of the multiplexer 50 may be coupled to an LNA for amplifying the RF receive signals within the second RF frequency band for further processing.

The RF coupler circuitry 54 includes a first coupled signal output node 62A and a second coupled signal output node 62B, an RF coupler 64, coupler filtering circuitry 66, and attenuator circuitry 68. The RF coupler 64 is arranged adjacent to the RF transmission line 60 such that a portion of the forward transmit signals provided via the RF transmission line 60 are coupled by the RF coupler 64 and provided to the coupler filtering circuitry 66 as RF feedback signals RF_FB. In some cases, the RF coupler 64 may also couple reverse power on the RF transmission line 60 to determine a voltage standing wave ratio (VSWR) associated therewith. The coupler filtering circuitry 66 is coupled to the RF coupler 64 and configured to receive the RF feedback signals RF_FB and separate them into RF feedback signals within the first RF frequency band RF_FB1 and RF feedback signals within the second frequency band RF_FB2. Accordingly, the coupler filtering circuitry 66 may be a diplexer in some embodiments, as discussed below. The attenuator circuitry 68 is coupled between the coupler filtering circuitry 66, the first coupled signal output node 62A, and the second coupled signal output node 62B, and is configured to attenuate the RF feedback signals within the first RF frequency band RF_FB1 and the RF feedback signals within the second RF frequency band RF_FB2 to compensate for the frequency dependence of the coupling factor of the RF coupler 64. Coupler control circuitry 70 may be coupled to the RF coupler circuitry 54 in order to control one or more operating parameters of the RF coupler 64, the coupler filtering circuitry 66, and the attenuator circuitry 68. Accordingly, while not shown, there may be multiple connections between the coupler control circuitry 70 and the RF coupler circuitry 54, and the coupler control circuitry 70 may provide multiple control signals to the components of the RF coupler circuitry 54. In some embodiments, the control signals for the RF coupler circuitry 54 may be provided from a baseband processor or other central control mechanism, rather than from discrete coupler control circuitry 70.

The feedback receiver circuitry 56 is coupled to each one of the first power amplifier 52A and the second power amplifier 52B, such that the feedback receiver circuitry 56 is coupled between the first coupled signal output node 62A, the second coupled signal output node 62B, the first power amplifier 52A, and the second power amplifier 52B. The feedback receiver circuitry 56 is configured to receive the RF feedback signals within the first RF frequency band RF_FB1 and provide a first power amplifier control signal PA_CNT1 based thereon, where the first power amplifier control signal PA_CNT1 is configured to change one or more operating parameters of the first power amplifier 52A in order to alter the transmit power of RF transmit signals provided therefrom. Further, the feedback receiver circuitry 56 is configured to receive the RF feedback signals within the second RF frequency band RF_FB2 and provide a second power amplifier control signal PA_CNT2 based thereon, where the second power amplifier control signal PA_CNT2 is configured to change one or more operating parameters of the second power amplifier 52B in order to alter the transmit power of RF transmit signals provided therefrom. While not shown, the feedback receiver circuitry 56 may include one or more feedback receiver amplifiers to amplify the RF feedback signals within the first RF frequency band RF_FB1 and the RF feedback signals within the second RF frequency band RF_FB2, and signal processing circuitry for generating the first power amplifier control signal PA_CNT1 and the second power amplifier control signal PA_CNT2 based thereon. The RF coupler circuitry 54 and the feedback receiver circuitry 56 form a closed loop feedback system in order to keep the transmit power of RF transmit signals provided from the RF front end circuitry 46 within a desired range.

In addition to measuring RF transmit signals, the RF coupler circuitry 54 may also measure reverse power for VSWR estimation and/or antenna-to-antenna leakage. The feedback receiver circuitry 56 may amplify and process these signals in order to provide control signals for one or more LNAs discussed above in order to amplify the RF receive signals to an appropriate level for further processing.

Figure 1:
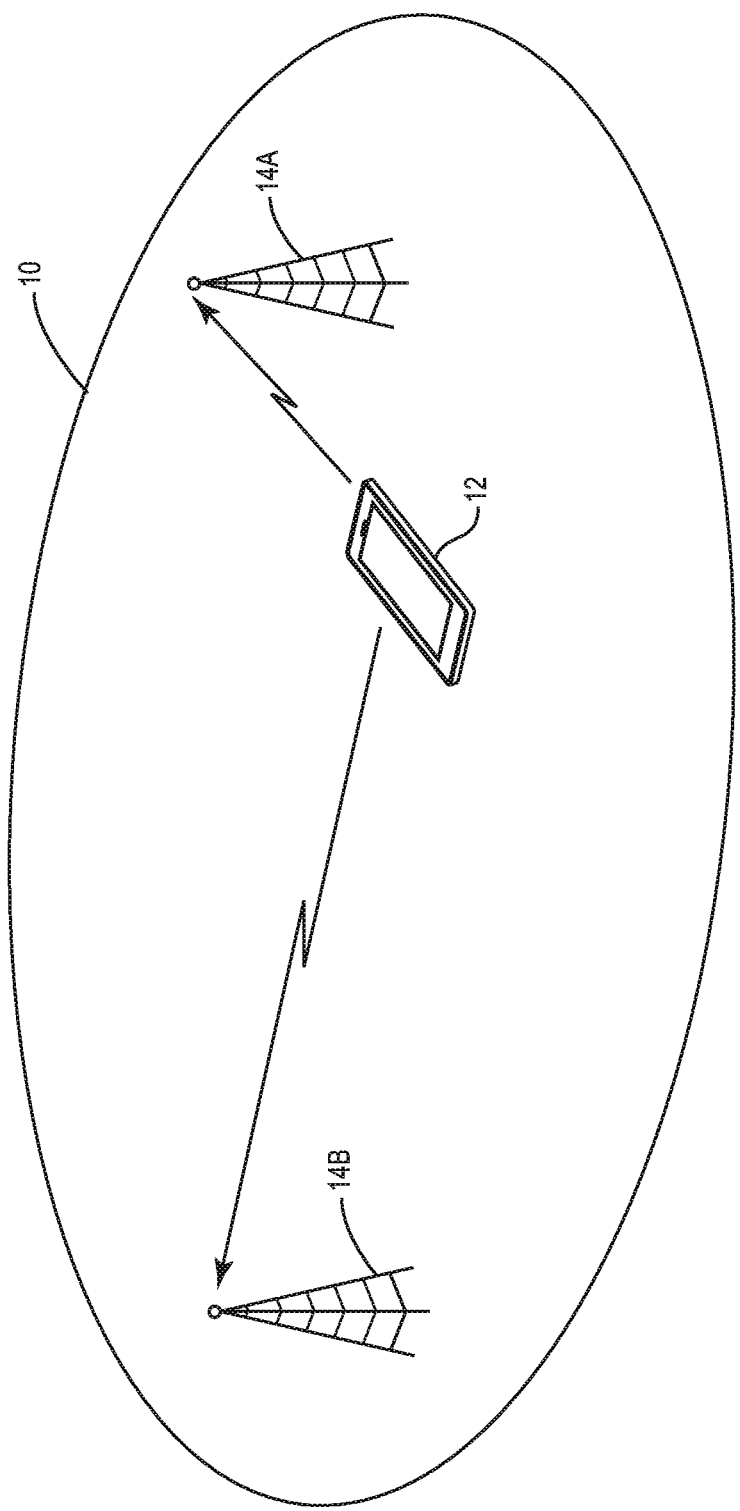
FIG. 1 is a diagram illustrating an exemplary wireless communications network.
Figure 2:
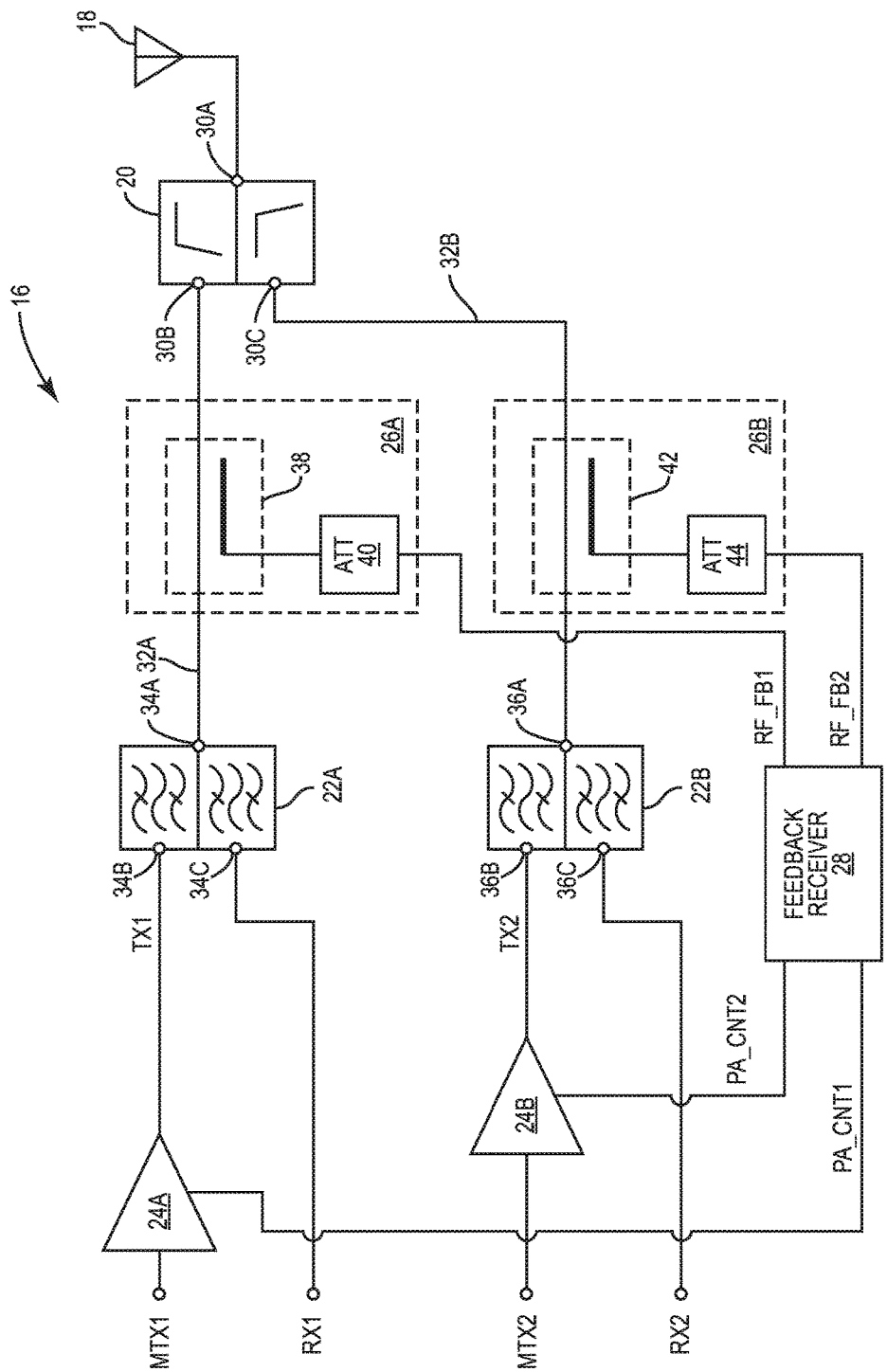
FIG. 2 is a functional schematic of conventional radio frequency (RF) front end circuitry.

By separating the RF feedback signals within the first RF frequency band RF_FB1 from the RF feedback signals within the second RF frequency band RF_FB2 within the RF coupler circuitry 54, the circuitry may be placed between the antenna 48 and the multiplexer 50, rather than downstream of the multiplexer 50 as discussed above with respect to FIG. 2. Moving the RF coupler circuitry 54 closer to the antenna 48 increases the accuracy of the RF feedback signals RF_FB such that a better estimation of transmit power may be achieved. Further, rather than requiring separate RF couplers for each multiplexed signal path, a single RF coupler may be used, thereby significantly simplifying the RF front end circuitry 46 and reducing the size thereof.

Figure 4:
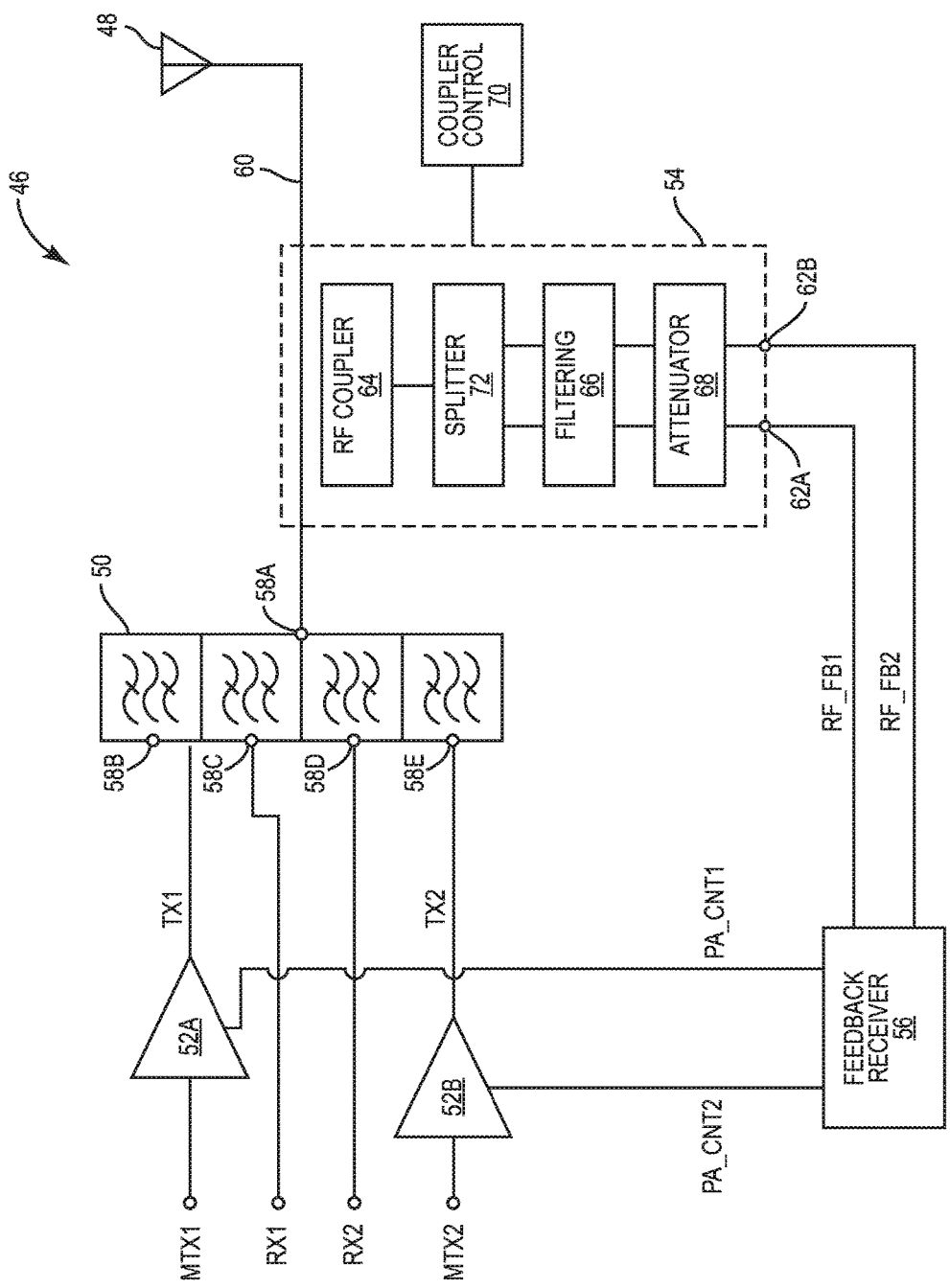
FIG. 4 is a functional schematic of RF front end circuitry according to one embodiment of the present disclosure.

FIG. 4 shows the RF front end circuitry 46 according to an additional embodiment of the present disclosure. The RF front end circuitry 46 shown in FIG. 4 is substantially similar to that shown in FIG. 3, except that the RF coupler circuitry 54 further includes power splitter circuitry 72 between the RF coupler 64 and the coupler filtering circuitry 66. As discussed above, the coupler filtering circuitry 66 may receive combined RF feedback signals RF_FB from the RF coupler 64 and separate them into RF feedback signals within the first RF frequency band RF_FB1 and RF feedback signals within the second RF frequency band RF_FB2. Accordingly, the coupler filtering circuitry 66 may be a diplexer. However, in some embodiments, the RF feedback signals RF_FB may be divided by the power splitter circuitry 72 and separately delivered to discrete filtering elements in the coupler filtering circuitry 66, as discussed below. As will be appreciated by those skilled in the art, it is often easier and cheaper to design discrete filtering elements compared to diplexers or multiplexers. Since insertion loss may not be a primary design concern in the RF coupler circuitry 54, using the power splitter circuitry 72 may therefore be advantageous in some circumstances.

Figure 5:
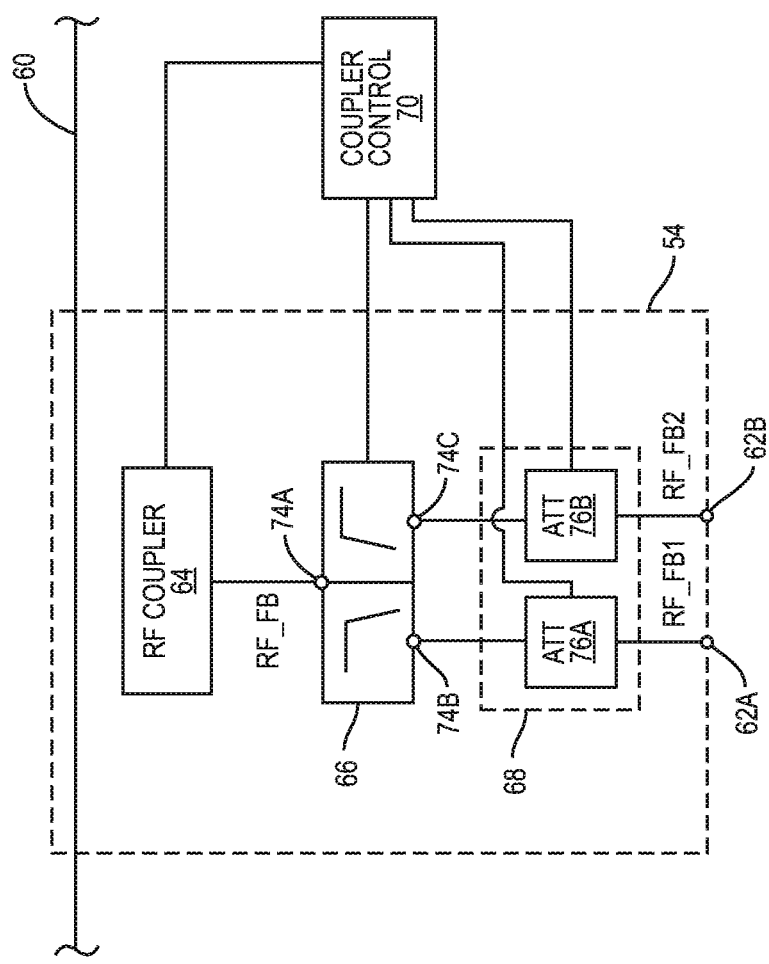
FIG. 5 is a functional schematic of RF coupling circuitry according to one embodiment of the present disclosure.

FIG. 5 shows details of the RF coupler circuitry 54 shown in FIG. 3 according to one embodiment of the present disclosure. For context, the coupler control circuitry 70 and the RF transmission line 60 are also shown. In the embodiment shown in FIG. 5, the coupler filtering circuitry 66 is a diplexer including a common node 74A, a first input/output node 74B, and a second input/output node 74C. The coupler filtering circuitry 66 is configured to receive the RF feedback signals RF_FB at the common node 74A and filter the RF feedback signals RF_FB such that the RF feedback signals within the first RF frequency band RF_FB1 are passed from the common node 74A to the first input/output node 74B and the RF feedback signals within the second RF frequency band RF_FB2 are passed from the common node 74A to the second input/output node 74C. In short, the coupler filtering circuitry 66 splits the RF feedback signals RF_FB into the RF feedback signals within the first RF frequency band RF_FB1 and the RF feedback signals within the second RF frequency band RF_FB2. The coupler filtering circuitry 66 may be adjustable such that the pass band of the filter response between the common node 74A and the first input/output node 74B and the common node 74A and the second input/output node 74C is tunable.

The coupler filtering circuitry 66 may comprise any number of different filter technologies, such as a lumped element filter, an acoustic filter (e.g., a bulk acoustic wave (BAW) filter and a surface acoustic wave (SAW) filter), a micro-electrical-mechanical system (MEMS) filter, or the like. While the RF front end circuitry 46 is shown including only two power amplifiers described for use with RF signals within the first RF frequency band and RF signals within the second RF frequency band RF_FB2, the concepts described above may be extended to RF front end circuitry including any number of power amplifiers and supporting any number of different RF frequency bands. In these embodiments, the coupler filtering circuitry 66 may comprise a multiplexer or any other suitable filtering circuitry for further separating the RF feedback signals RF_FB into additional RF frequency bands.

The attenuator circuitry 68 includes a first attenuator 76A and a second attenuator 76B. The first attenuator 76A is coupled between the first input/output node 74B of the coupler filtering circuitry 66 and the first coupled signal output node 62A. The second attenuator 76B is coupled between the second input/output node 74C of the coupler filtering circuitry 66 and the second coupled signal output node 62B. The first attenuator 76A and the second attenuator 76B may be adjustable to provide a desired level of attenuator to the RF feedback signals within the first RF frequency band RF_FB1 and the RF feedback signals within the second RF frequency band RF_FB2, respectively. In some embodiments, the first attenuator 76A and the second attenuator 76B are adjusted based on signals provided by the coupler control circuitry 70 such that the RF feedback signals within the first RF frequency band RF_FB1 and the RF feedback signals within the second RF frequency band RF_FB2 are independently compensated for changes in the coupling factor of the RF coupler 64 due to the frequency of the signals and to maximize the dynamic range of the feedback receiver circuitry 56. The first attenuator 76A and the second attenuator 76B may comprise any suitable attenuator technology capable of the functionality described above without departing from the principles described herein.

Figure 6:
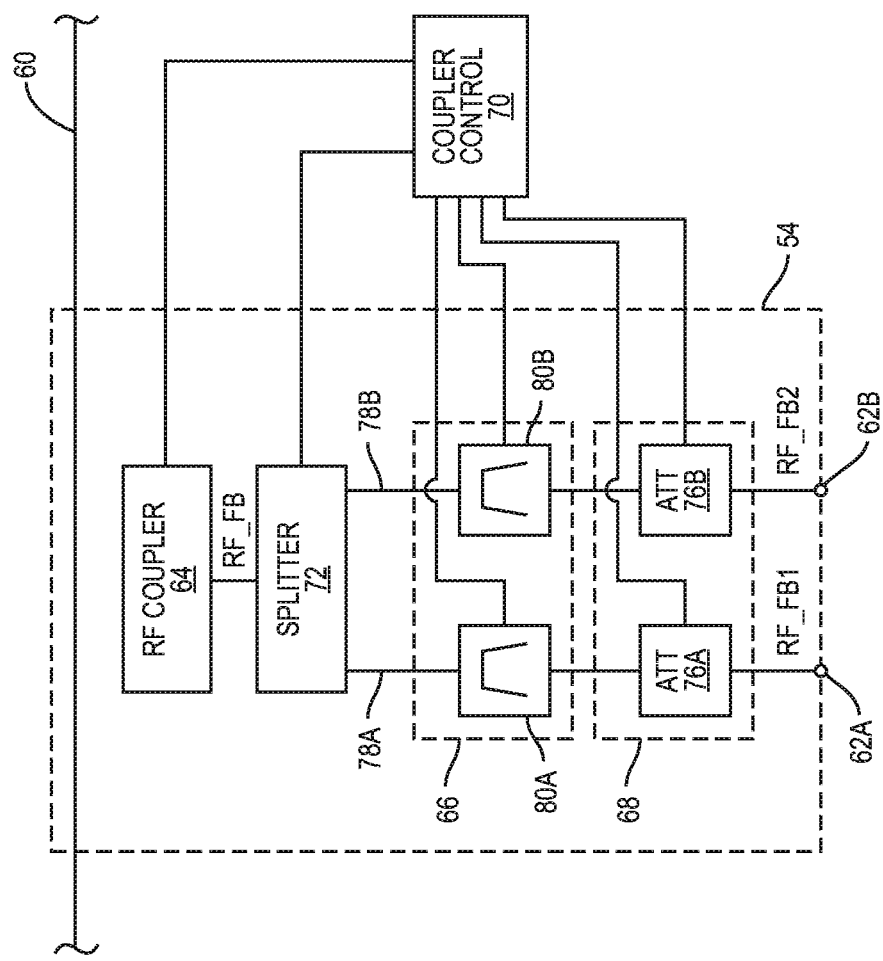
FIG. 6 is a functional schematic of RF coupling circuitry according to one embodiment of the present disclosure.

As discussed above with respect to FIG. 4, the power splitter circuitry 72 may be provided between the RF coupler 64 and the coupler filtering circuitry 66 in order to simplify the design of the coupler filtering circuitry 66 in some embodiments. Accordingly, FIG. 6 shows details of the RF coupler circuitry 54 shown in FIG. 4 according to one embodiment of the present disclosure. In the embodiment shown in FIG. 6, the power splitter circuitry 72 receives the RF feedback signals RF_FB and divides the signals into a first signal path 78A and a second signal path 78B. In some embodiments, the RF feedback signals RF_FB are evenly divided by the power splitter circuitry 72. However, the power splitter circuitry 72 may divide the RF feedback signals RF_FB in any number of different ways without departing from the principles of the present disclosure. The first signal path 78A may be coupled to a first bandpass filter 80A in the coupler filtering circuitry 66. The first bandpass filter 80A may be configured to filter the portion of the RF feedback signals RF_FB received via the first signal path 78A such that only the RF feedback signals within the first RF frequency band RF_FB1 are provided to the first attenuator 76A. Similarly, the second signal path 78B may be coupled to a second bandpass filter 80B in the coupler filtering circuitry 66. The second bandpass filter 80B may be configured to filter the portion of the RF feedback signals RF_FB received via the second signal path 78B such that only the RF feedback signals within the second RF frequency band RF_FB2 are provided to the second attenuator 76B. The first attenuator 76A and the second attenuator 76B may function as described above.

In some embodiments, the power splitter circuitry 72 may be adjustable in order to control the division of the RF feedback signals RF_FB among the first signal path 78A and the second signal path 78B. The coupler control circuitry 70 (or any other suitable circuitry) may provide control signals to the power splitter circuitry 72 in order to accomplish this task.

The power splitter circuitry 72 may comprise any suitable power splitter. For example, the power splitter circuitry 72 may be a resistive power splitter, a capacitive power splitter, an inductive power splitter, or any combination thereof. Using the power splitter circuitry 72 significantly simplifies the design of the coupler filtering circuitry 66. As discussed above, diplexers and other multiplexers are generally more difficult to design and are more expensive than discrete filters. The power splitter circuitry 72 allows the first bandpass filter 80A and the second bandpass filter 80B to replace the diplexer shown above in FIG. 5. While the power splitter circuitry 72 may increase the insertion loss between the RF coupler 64 and the attenuator circuitry 68, such an increase in insertion loss generally does not affect the usability of the RF feedback signals.

The first bandpass filter 80A and the second bandpass filter 80B may comprise any suitable filter technology such as those discussed above with respect to the diplexer. The bandpass response of the first bandpass filter 80A and the second bandpass filter 80B may be adjustable by control signals provided by the coupler control circuitry 70 in some embodiments.

In some embodiments, the power splitter circuitry 72 may be omitted from the RF coupler circuitry 54. In such embodiments, only a single bandpass filter may be provided, and the response thereof may be dynamically tuned in order to pass the RF feedback signals within the first RF frequency band RF_FB1 within a first time period and pass the RF feedback signals within the second RF frequency band RF_FB2 with a second time period. That is, the RF feedback signals within the first RF frequency band RF_FB1 may be separately sampled at different times, thereby requiring only a single signal from the RF coupler 64 to the attenuator circuitry 68. Such an approach may save space in the RF coupler circuitry 54 at the expense of increased control overhead.

Figure 7:
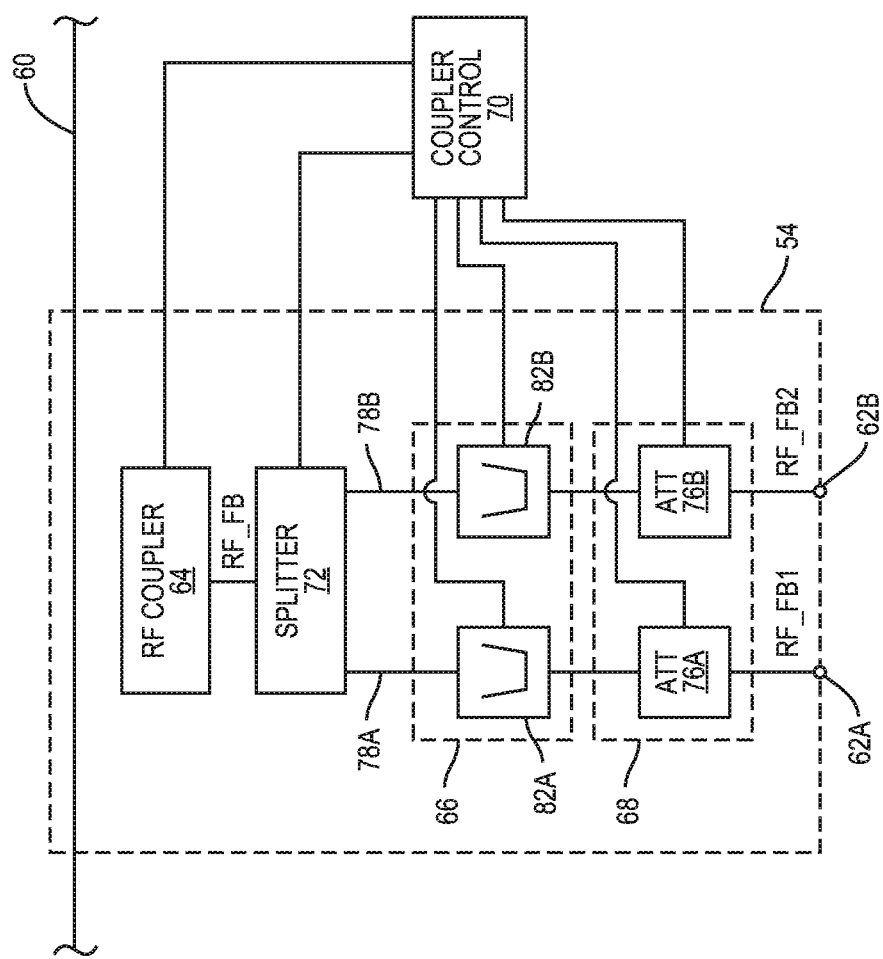
FIG. 7 is a functional schematic of RF coupling circuitry according to one embodiment of the present disclosure.

FIG. 7 shows the RF coupler circuitry 54 according to an additional embodiment of the present disclosure. The RF coupler circuitry 54 shown in FIG. 7 is substantially similar to that shown in FIG. 6, except that the first bandpass filter 80A and the second bandpass filter 80B are replaced with a first notch filter 82A and a second notch filter 82B. Generally, the largest blocker signal experienced by the RF feedback signals within the first RF frequency band RF_FB1 are the RF feedback signals within the second RF frequency band RF_FB2, and vice versa. That is, there are very few signals outside of these RF frequency bands that will interfere with the measurements of concern. Accordingly, the first notch filter 82A may be configured to attenuate the RF signals within the first RF frequency band RF_FB1 while passing all other signals, while the second notch filter 82B may be configured to attenuate the RF signals within the second RF frequency band RF_FB2 while passing all other signals. As will be appreciated by those skilled in the art, notch filters are often simpler to design than bandpass filters, and may be smaller as well. Since there is a relatively small and well known blocker signal to attenuate, notch filters are well suited for the task.

As discussed above, the power splitter circuitry 72 may comprise any suitable power splitter without departing from the principles described herein. Further, the first notch filter 82A and the second notch filter 82B may also comprise any suitable filter technology. The concepts discussed above wherein the power splitter circuitry 72 is omitted and only a single notch filter is used also apply to the embodiment shown in FIG. 7 and will be appreciated by those skilled in the art.

Figure 8:
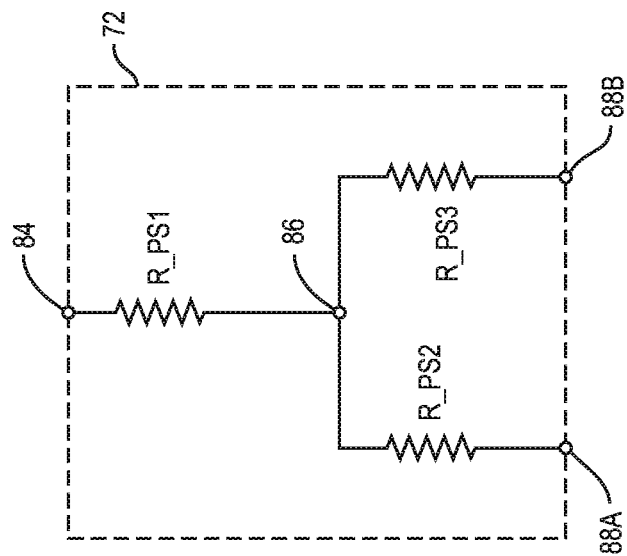
FIG. 8 is a functional schematic of power splitter circuitry according to one embodiment of the present disclosure.

FIG. 8 shows exemplary power splitter circuitry 72 according to one embodiment of the present disclosure. As discussed above, the power splitter circuitry 72 may be a resistive power splitter including a first power splitter resistor R_PS1, a second power splitter resistor R_PS2, and a third power splitter resistor R_PS3. The first power splitter resistor R_PS1 may be coupled between a power splitter input node 84 and a power splitter common node 86. The second power splitter resistor R_PS2 may be coupled between the power splitter common node 86 and a first power splitter output node 88A. The second power splitter resistor R_PS2 may be coupled between the power splitter common node 86 and a second power splitter output node 88B. The power splitter circuitry 72 may be configured to receive the RF feedback signals RF_FB at the power splitter input node 84 from the RF coupler 64 and divide the RF feedback signals RF_FB between the first power splitter output node 88A and the second power splitter output node 88B as discussed above. While not shown, the first power splitter resistor R_PS1, the second power splitter resistor R_PS2, and the third power splitter resistor R_PS3 may be adjustable such that the particular ratio between the divided RF feedback signals RF_FB at the first power splitter output node 88A and the second power splitter output node 88B are tunable. In some embodiments, the power splitter circuitry 72 may perform the function of the attenuator circuitry 68 in this manner. While resistive power splitter circuitry is shown in FIG. 8, the power splitter circuitry 72 may comprise capacitive power splitter circuitry, inductive power splitter circuitry, LC power splitter circuitry (e.g., a Wilkinson power splitter), or any combination of resistive, capacitive, and inductive power splitter circuitry without departing from the principles of the present disclosure.

Figure 9:
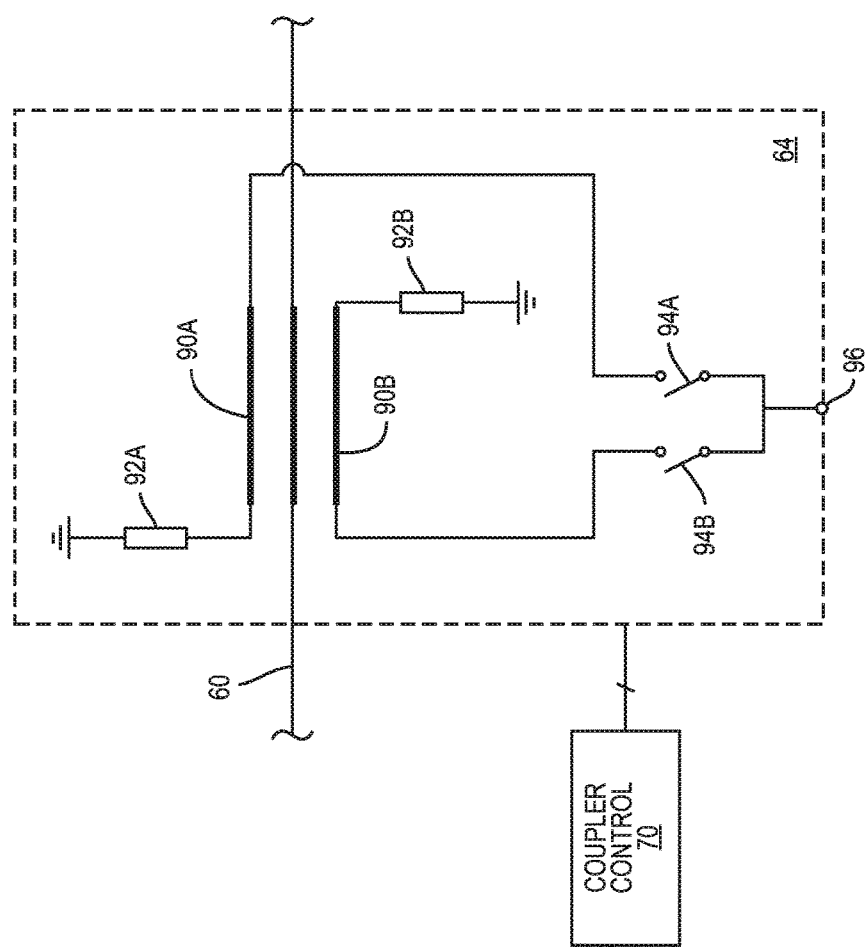
FIG. 9 is a functional schematic of an RF coupler according to one embodiment of the present disclosure.

Any suitable type of RF coupler 64 may be used in the RF coupler circuitry 54 without departing from the principles of the present disclosure. Generally, the RF coupler circuitry 54 will be a directional coupler, and may include selectable forward and reverse directionality. FIG. 9 shows an RF coupler 64 that may be used in any of the RF coupler circuitry 54 described above without departing from the principles of the present disclosure. The RF coupler 64 includes a first RF coupling line 90A coupled between a first termination impedance 92A and a first coupling switch 94A, and a second RF coupling line 90B coupled between a second termination impedance 92B and a second coupling switch 94B. The coupler control circuitry 70 may be coupled to the first coupling switch 94A and the second coupling switch 94B (direct connections not shown to avoid obscuring the drawings) in order to operate the switches. The first coupling switch 94A may be closed and the second coupling switch 94B may be opened in order to provide coupled RF receive signals to an coupler output node 96 of the RF coupler 64. The first coupling switch 94A may be opened and the second coupling switch 94B closed in order to provide coupled RF transmit signals to the coupler output node 96 of the RF coupler 64. In short, by changing the state of the first coupling switch 94A and the second coupling switch 94B, the RF coupler 64 may be switched between transmit signal coupling and receive signal coupling.

Figure 10:
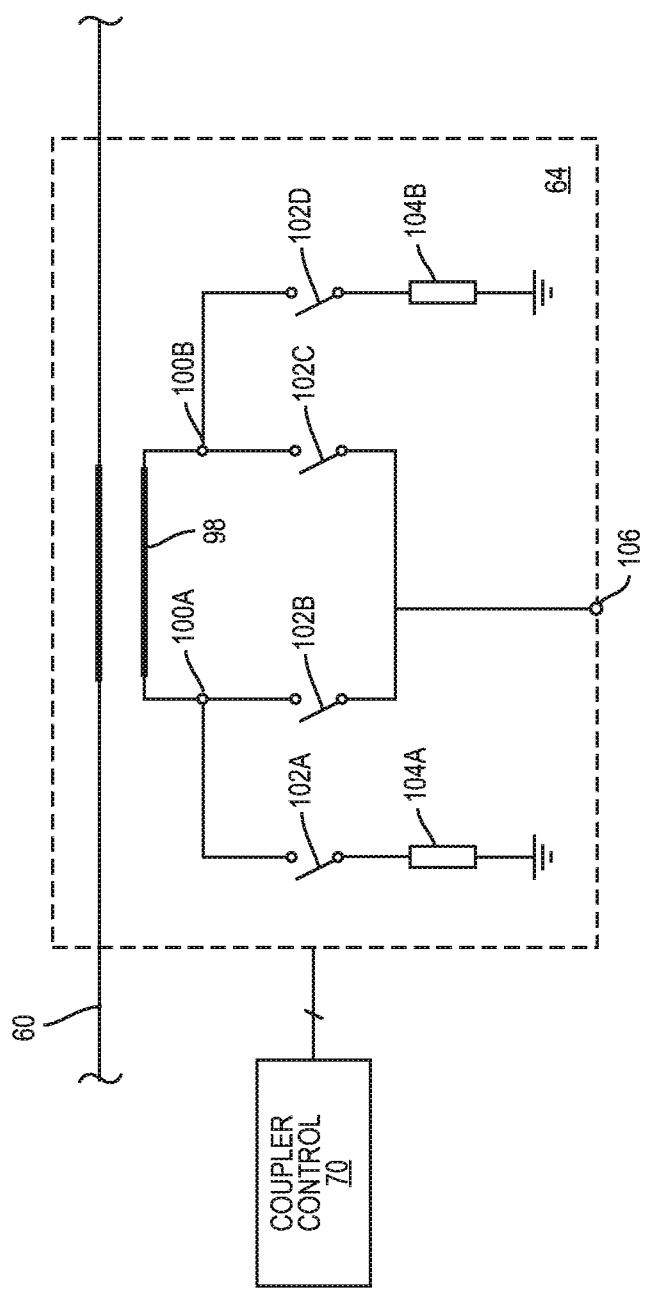
FIG. 10 is a functional schematic of an RF coupler according to one embodiment of the present disclosure.

FIG. 10 shows the RF coupler 64 according to an additional embodiment of the present disclosure. The RF coupler 64 includes an RF coupling line 98 coupled between a first coupler intermediate node 100A and a second coupler intermediate node 100B. A first coupler switch 102A is coupled in series with a first termination impedance 104A between the first coupler intermediate node 100A and ground. A second coupler switch 102B is coupled between the first coupler intermediate node 100A and a coupler output node 106. A third coupler switch 102C is coupled between the second coupler intermediate node 100B and the coupler output node 106. A fourth coupler switch 102D is coupled in series with a second termination impedance 104B between the second coupler intermediate node 100B and ground. The coupler control circuitry 70 may be coupled to the first coupler switch 102A, the second coupler switch 102B, the third coupler switch 102C, and the fourth coupler switch 102D (direct connections not shown to avoid obscuring the drawings) in order to operate the switches. The first coupler switch 102A and the third coupler switch 102C may be closed and the second coupler switch 102B and the fourth coupler switch 102D opened in order to provide coupled RF receive signals to the coupler output node 106 of the RF coupler 64. The second coupler switch 102B and the fourth coupler switch 102D may be closed and the first coupler switch 102A and the third coupler switch 102C opened in order to provide coupled RF transmit signals to the coupler output node 106 of the RF coupler 64. In short, by changing the state of the first coupler switch 102A, the second coupler switch 102B, the third coupler switch 102C, and the fourth coupler switch 102D, the RF coupler 64 may be switched between transmit signal coupling and receive signal coupling. The RF coupler 64 shown in FIG. 10 may have a reduced footprint when compared to that shown in FIG. 9 due to the fact that only a single RF coupling line is required.

Figure 11:
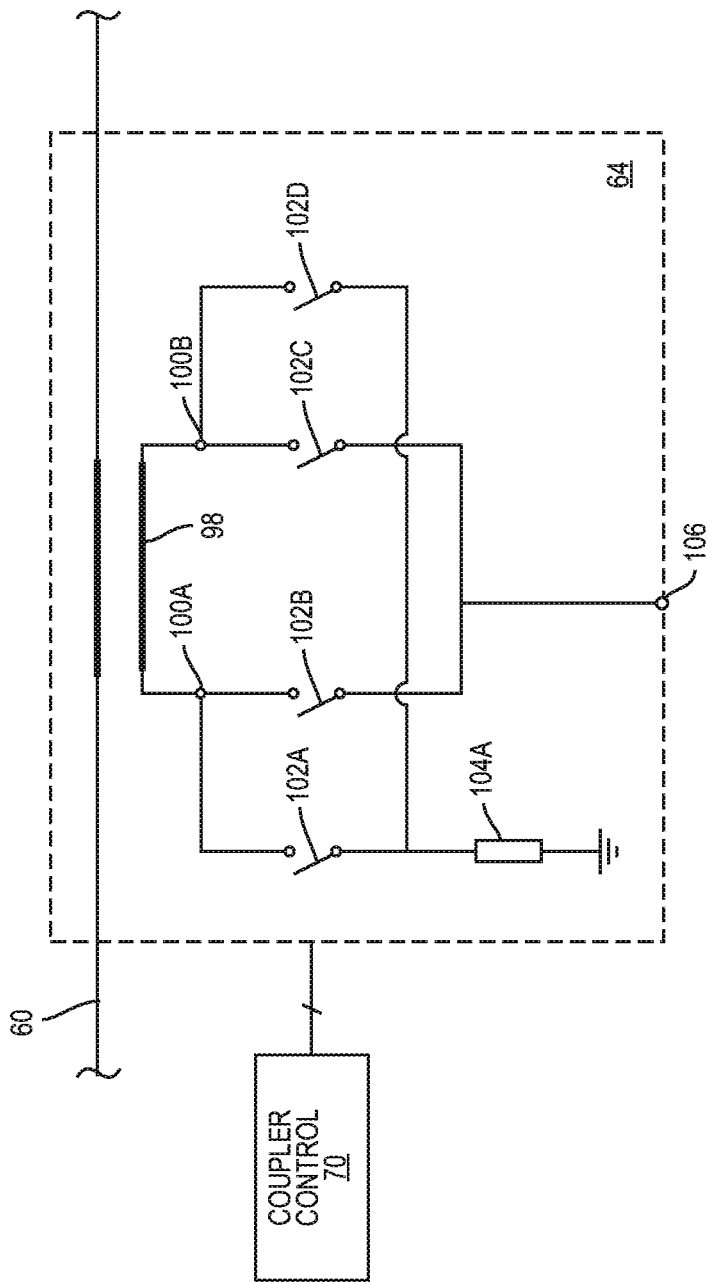
FIG. 11 is a functional schematic of an RF coupler according to one embodiment of the present disclosure.

FIG. 11 shows the RF coupler 64 according to yet another embodiment of the present disclosure. The RF coupler 64 shown in FIG. 11 is substantially similar to that shown in FIG. 10, except that the second termination impedance 104B is removed such that the fourth coupler switch 102D is coupled between the second coupler intermediate node 100B and the first termination impedance 104A. By removing the second termination impedance 104B, the size of the RF coupler 64 may be further reduced.

Figure 12:
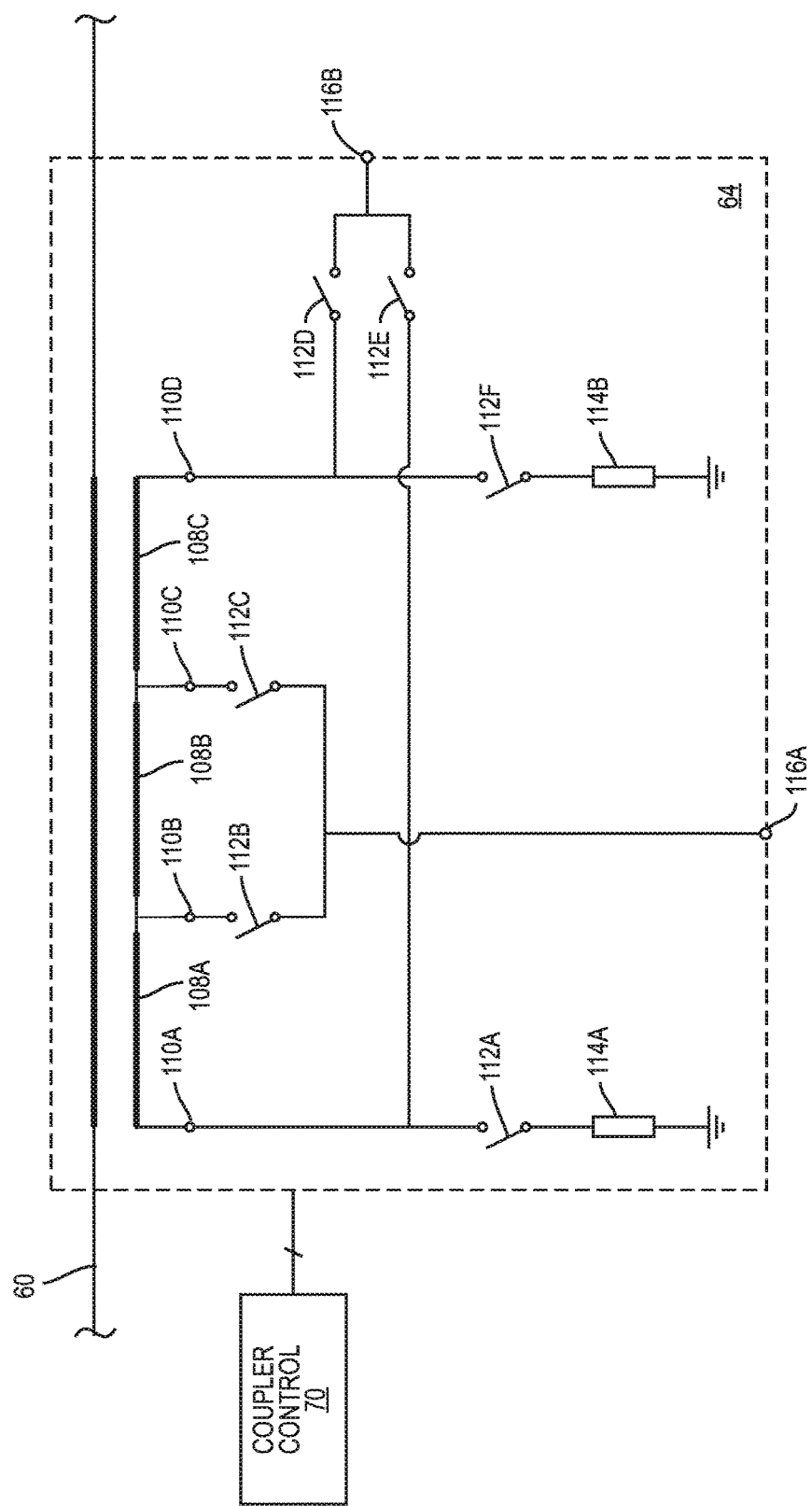
FIG. 12 is a functional schematic of an RF coupler according to one embodiment of the present disclosure.

FIG. 12 shows the RF coupler 64 according to an additional embodiment of the present disclosure. In some embodiments of the present disclosure, neither power splitter circuitry nor a diplexer are required to divide the RF feedback signals RF_FB, as this task may be accomplished by the RF coupler 64. Further, it may be desirable to provide different coupling factors for coupling RF feedback signals RF_FB within different RF frequency bands in some cases. Accordingly, the RF coupler 64 shown in FIG. 12 include a first RF coupling line 108A, a second RF coupling line 108B, and a third RF coupling line 108C. The first RF coupling line 108A is coupled between a first coupler intermediate node 110A and a second coupler intermediate node 110B. The second RF coupling line 108B is coupled between the second coupler intermediate node 110B and a third coupler intermediate node 110C. The third RF coupling line 108C is coupled between the third coupler intermediate node 110C and a fourth coupler intermediate node 110D. A first coupler switch 112A is coupled in series with a first termination impedance 114A between the first coupler intermediate node 110A and ground. A second coupler switch 112B is coupled between the second coupler intermediate node 110B and a first coupler output node 116A. A third coupler switch 112C is coupled between the third coupler intermediate node 110C and the first coupler output node 116A. A fourth coupler switch 112D is coupled between the fourth coupler intermediate node 110D and a second coupler output node 116B. A fifth coupler switch 112E is coupled between the first coupler intermediate node 110A and the second coupler output node 116B. A sixth coupler switch 112F is coupled in series with a second termination impedance 114B between the fourth coupler intermediate node 110D and ground.

The coupler control circuitry 70 may be coupled to the first coupler switch 112A, the second coupler switch 112B, the third coupler switch 112C, the fourth coupler switch 112D, the fifth coupler switch 110E, and the sixth coupler switch 110F (direct connections not shown to avoid obscuring the drawings) in order to operate the switches. To simultaneously couple RF receive signals within the first RF frequency band and RF receive signals within the second RF frequency band, the first coupler switch 112A, the second coupler switch 112B, and the fourth coupler switch 112D may be closed while the third coupler switch 112C, the fifth coupler switch 112E, and the sixth coupler switch 112F are opened. RF feedback signals RF_FB coupled using a first coupling factor are provided at the first coupler output node 116A, while RF feedback signals RF_FB coupled using a second coupling factor are provided at the second coupler output node 116B. This is due to the different lengths of RF coupling line coupled between the first coupler output node 116A, the second coupler output node 116B, and the first termination impedance 114A. The first coupling factor may be better suited for coupling RF feedback signals within the first RF frequency band RF_FB1, while the second coupling factor may be better suited to coupling RF feedback signals within the second RF frequency band RF_FB2. Specifically, the respective coupling factors may provide the best tradeoff between coupling factor and insertion loss for the first RF frequency band and the second RF frequency band, since these coupling factors are likely different at these different frequencies.

To simultaneously couple RF transmit signals within the first RF frequency band RF_FB1 and RF transmit signals within the second RF frequency band RF_FB2, the third coupler switch 112C, the fifth coupler switch 112E, and the sixth coupler switch 112F may be closed while the first coupler switch 112A, the second coupler switch 112B, and the fourth coupler switch 112D are open. RF feedback signals RF_FB coupled using a first coupling factor are provided at the first coupler output node 116A, while RF feedback signals RF_FB coupled using a second coupling factor are provided at the second coupler output node 116B. This is due to the different lengths of RF coupling line coupled between the first coupler output node 116A, the second coupler output node 116B, and the second termination impedance 114B. The first coupling factor may be better suited for coupling RF feedback signals within the first RF frequency band RF_FB1, while the second coupling factor may be better suited to coupling RF feedback signals within the second RF frequency band RF_FB2. Specifically, the respective coupling factors may provide the best tradeoff between coupling factor and insertion loss for the first RF frequency band and the second RF frequency band, since these coupling factors are likely different at these different frequencies.

To couple only a single RF receive signal or RF transmit signal, only two of the coupler switches 112 are closed at a time as appropriate, as will be understood by those skilled in the art. By changing the length of the RF coupling line between the appropriate output node and a termination impedance, the coupling factor of the RF coupler 64 can be adjusted as appropriate to provide the best tradeoff between coupling factor and insertion loss, as described in copending and coassigned U.S. patent application Ser. No. 14/815,252, now U.S. Pat. No. 9,503,044, which describes a number of RF couplers that may be used with the RF coupler circuitry 54 described herein, the contents of which are hereby incorporated by reference in their entirety.

Those skilled in the art will recognize improvements and modifications to the embodiments of the present disclosure. All such improvements and modifications are considered within the scope of the concepts disclosed herein and the claims that follow.

What is claimed is:

1. Radio frequency (RF) coupler circuitry comprising:
   a first coupled signal output node and a second coupled signal output node;
   an RF coupler configured to couple RF signals from an RF transmission line to provide coupled RF signals;
   RF filtering circuitry coupled to the RF coupler and configured to separate the coupled RF signals into RF feedback signals within a first RF frequency band and into RF feedback signals within a second RF frequency band; and
   attenuator circuitry coupled between the RF filtering circuitry, the first coupled signal output node, and the second coupled signal output node and configured to:
      attenuate the RF feedback signals within the first RF frequency band and provide the RF feedback signals within the first RF frequency band to the first coupled signal output node; and
      attenuate the RF feedback signals within the second RF frequency band and provide the RF feedback signals within the second RF frequency band to the second coupled signal output node.

2. The RF coupler circuitry of claim 1 wherein the RF filtering circuitry is a diplexer.

3. The RF coupler circuitry of claim 2 wherein the diplexer comprises a common node coupled to the RF coupler, a first diplexer output node coupled to the attenuator circuitry, and a second diplexer output node coupled to the attenuator circuitry, and the diplexer is configured to receive the coupled RF signals at the common node and separate the RF feedback signals within the first RF frequency band from the RF feedback signals within the second RF frequency band, providing the RF feedback signals within the first RF frequency band to the first diplexer output node and the RF feedback signals within the second RF frequency band to the second diplexer output node.

4. The RF coupler circuitry of claim 3 wherein the attenuator circuitry comprises a first adjustable attenuator coupled between the first diplexer output node and the first coupled signal output node and a second adjustable attenuator coupled between the second diplexer output node and the second coupled signal output node.

5. The RF coupler circuitry of claim 1 further comprising a power splitter coupled between the RF coupler and the RF filtering circuitry, the power splitter comprising a power splitter input node, a first split power node, and a second split power node and configured to receive the coupled RF signals at the power splitter input node and split the coupled RF signals between the first split power node and the second split power node.

6. The RF coupler circuitry of claim 5 wherein the power splitter is a resistive divider.

7. The RF coupler circuitry of claim 5 wherein the RF filtering circuitry comprises:
   a first bandpass filter coupled between the first split power node and the attenuator circuitry and configured to pass the RF feedback signals within the first RF frequency band between the first split power node and the attenuator circuitry while attenuating signals outside the first RF frequency band; and
   a second bandpass filter coupled between the second split power node and the attenuator circuitry and configured to pass the RF feedback signals within the second RF frequency band between the second split power node and the attenuator circuitry while attenuating signals outside the second RF frequency band.

8. The RF coupler circuitry of claim 7 wherein the attenuator circuitry comprises a first adjustable attenuator coupled between the first bandpass filter and the first coupled signal output node and a second adjustable attenuator coupled between the second bandpass filter and the second coupled signal output node.

9. The RF coupler circuitry of claim 5 wherein the RF filtering circuitry comprises:
   a first notch filter coupled between the first split power node and the attenuator circuitry and configured to attenuate the RF feedback signals within the second RF frequency band while passing signals outside the second RF frequency band between the first split power node and the attenuator circuitry; and
   a second notch filter coupled between the second split power node and the attenuator circuitry and configured to attenuate the RF feedback signals within the first RF frequency band while passing signals outside the first RF frequency band between the second split power node and the attenuator circuitry.

10. The RF coupler circuitry of claim 9 wherein the attenuator circuitry comprises a first adjustable attenuator coupled between the first notch filter and the first coupled signal output node and a second adjustable attenuator coupled between the second notch filter and the second coupled signal output node.

11. Radio frequency (RF) front end circuitry comprising:
an antenna;
transceiver circuitry;
an RF transmission line coupled between the antenna and the transceiver circuitry;
RF coupler circuitry comprising:
a first coupled signal output node and a second coupled signal output node;
an RF coupler configured to couple RF signals from the RF transmission line to provide coupled RF signals;
RF filtering circuitry coupled to the RF coupler and configured to separate the coupled RF signals into RF feedback signals within a first RF frequency band and into RF feedback signals within a second RF frequency band; and
attenuator circuitry coupled between the RF filtering circuitry, the first coupled signal output node, and the second coupled signal output node and configured to:
attenuate the RF feedback signals within the first RF frequency band and provide the RF feedback signals within the first RF frequency band to the first coupled signal output node; and
attenuate the RF feedback signals within the second RF frequency band and provide the RF feedback signals within the second RF frequency band to the second coupled signal output node;
wherein the RF feedback signals within the first RF frequency band are used as feedback signals to adjust a transmit power of one or more RF transmit signals provided by the transceiver circuitry.

12. The RF front end circuitry of claim 11 wherein the RF filtering circuitry is a diplexer.

13. The RF front end circuitry of claim 12 wherein the diplexer comprises a common node coupled to the RF coupler, a first diplexer output node coupled to the attenuator circuitry, and a second diplexer output node coupled to the attenuator circuitry, and the diplexer is configured to receive the coupled RF signals at the common node and separate the RF feedback signals within the first RF frequency band from the RF feedback signals within the second RF frequency band, providing the RF feedback signals within the first RF frequency band to the first diplexer output node and the RF feedback signals within the second RF frequency band to the second diplexer output node.

14. The RF front end circuitry of claim 13 wherein the attenuator circuitry comprises a first adjustable attenuator coupled between the first diplexer output node and the first coupled signal output node and a second adjustable attenuator coupled between the second diplexer output node and the second coupled signal output node.

15. The RF front end circuitry of claim 11 further comprising a power splitter coupled between the RF coupler and the RF filtering circuitry, the power splitter comprising a power splitter input node, a first split power node, and a second split power node and configured to receive the coupled RF signals at the power splitter input node and split the coupled RF signals between the first split power node and the second split power node.

16. The RF front end circuitry of claim 15 wherein the power splitter is a resistive divider.

17. The RF front end circuitry of claim 15 wherein the RF filtering circuitry comprises:
a first bandpass filter coupled between the first split power node and the attenuator circuitry and configured to pass the RF feedback signals within the first RF frequency band between the first split power node and the attenuator circuitry while attenuating signals outside the first RF frequency band; and
a second bandpass filter coupled between the second split power node and the attenuator circuitry and configured to pass the RF feedback signals within the second RF frequency band between the second split power node and the attenuator circuitry while attenuating signals outside the second RF frequency band.

18. The RF front end circuitry of claim 17 wherein the attenuator circuitry comprises a first adjustable attenuator coupled between the first bandpass filter and the first coupled signal output node and a second adjustable attenuator coupled between the second bandpass filter and the second coupled signal output node.

19. The RF front end circuitry of claim 15 wherein the RF filtering circuitry comprises:
a first notch filter coupled between the first split power node and the attenuator circuitry and configured to attenuate the RF feedback signals within the second RF frequency band while passing signals outside the second RF frequency band between the first split power node and the attenuator circuitry; and
a second notch filter coupled between the second split power node and the attenuator circuitry and configured to attenuate the RF feedback signals within the first RF frequency band while passing signals outside the first RF frequency band between the second split power node and the attenuator circuitry.

20. The RF front end circuitry of claim 19 wherein the attenuator circuitry comprises a first adjustable attenuator coupled between the first notch filter and the first coupled signal output node and a second adjustable attenuator coupled between the second notch filter and the second coupled signal output node.

* * * * *